Sept. 1, 1970 W. PECS 3,526,795
TORQUE REACTION ATTITUDE CONTROL DEVICE
Filed June 19, 1967 2 Sheets-Sheet 2
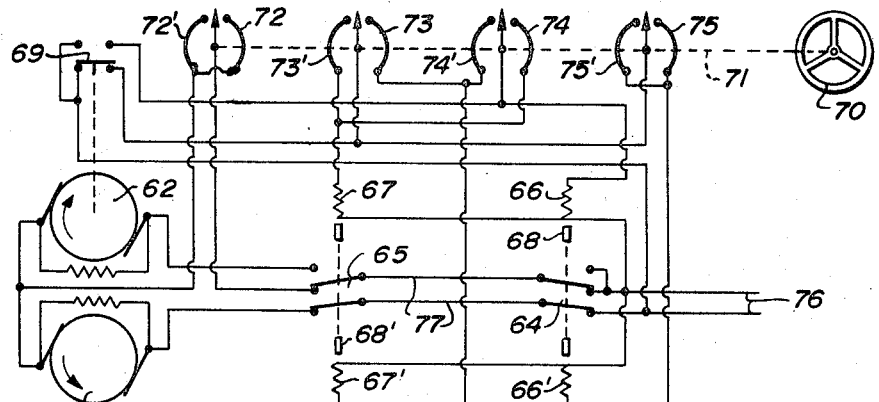
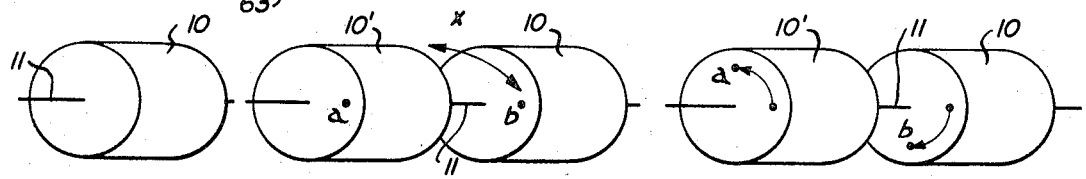
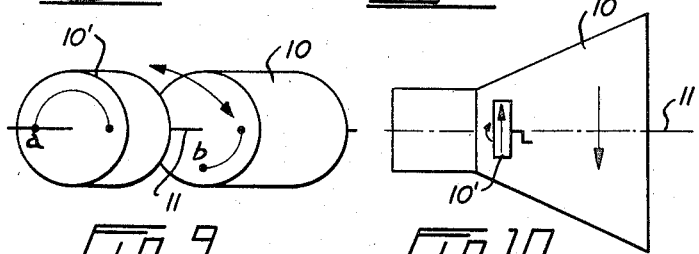
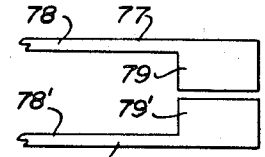
INVENTOR
WILLIAM PECS
BY
ATTORNEY United States Patent Office 3,526,795
Patented Sept. 1, 1970

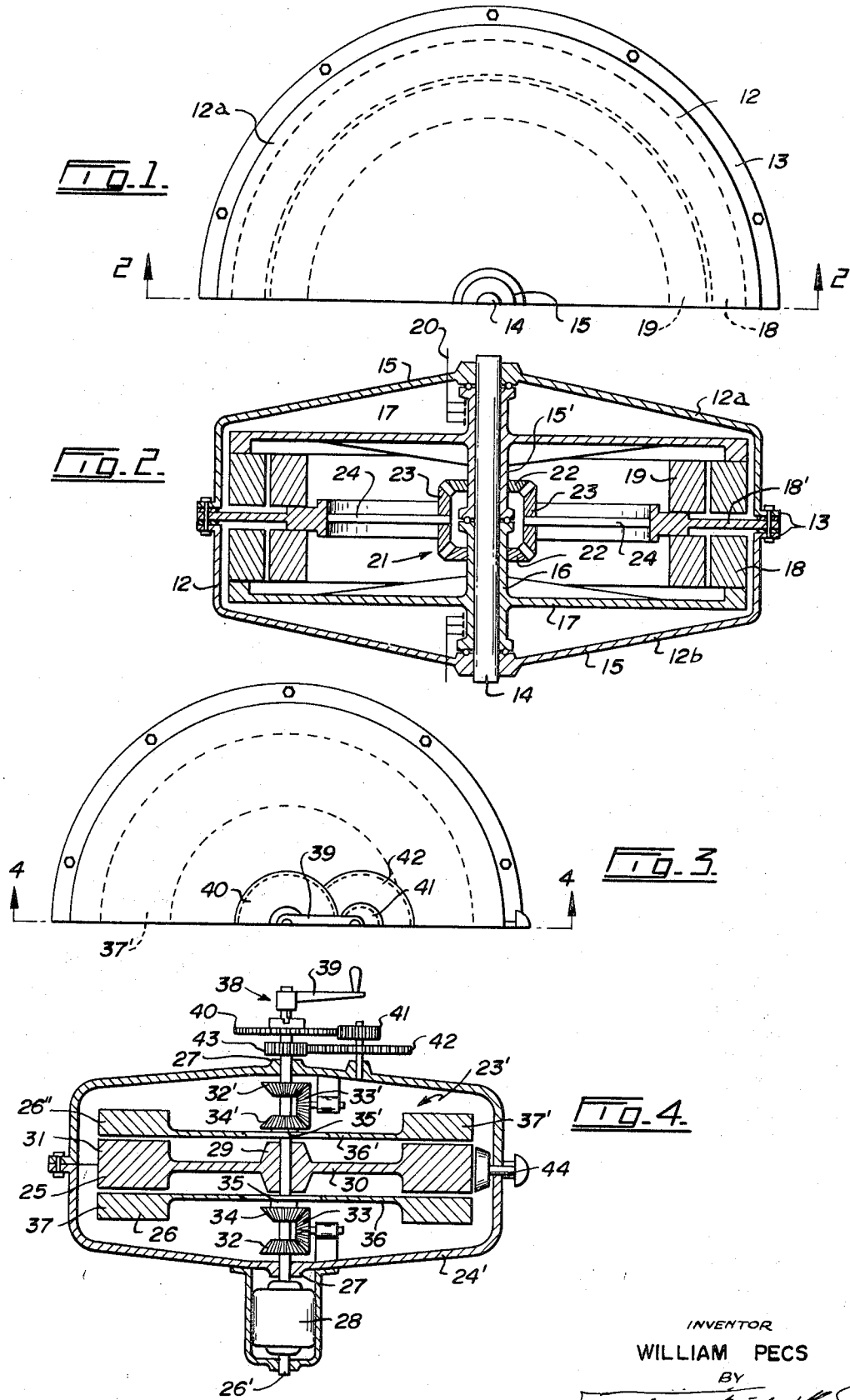

3,526,795
TORQUE REACTION ATTITUDE
CONTROL DEVICE
William Pecs, 610 Sherburn St., Winnipeg,
Manitoba, Canada
Filed June 19, 1967, Ser. No. 646,951
Claims priority, application Great Britain, June 20, 1966,
27,380/66
Int. Cl. H02k 7/02
U.S. Cl. 310—74                                     6 Claims

ABSTRACT OF THE DISCLOSURE

A torque reaction attitude control device having a rotatable flywheel assembly which includes inner and outer flywheels, each having ring-like portons of equal mass, for rotation in opposite directions, respectively, for the purpose of counteracting the gyroscopic effect within the device. The hub portions of the flywheels are operatively connected to electrical brush connections for providing the power source thereto. A gearing system is operatively connected to the respective flywheels for maintaining substantially identical speed of rotation thereof.

---

The invention relates to new and useful improvements in torque reaction attitude control devices and although it is primarily designed for the use in space capsules or the like, nevertheless the principles involved can be utilized for controlling a submarine, a surface ship or an aircraft.

It is well known to utilize torque reaction of a flywheel for various purposes but unfortunately, the gyroscopic effect and excessive weight of the flywheel often inhibits the use of such a method.

I have overcome this principal disadvantage by dividing the flywheel assembly into two parts having equal mass and then rotating them in opposite directions and at the same speed thereby counteracting the gyroscopic effect of the flywheels and enabling the torque reaction to be utilized usefully.

A low speed operation is achieved by applying a control system which changes the acceleration and the deceleration forces on the two flywheels at short intervals to the extent that even a stepped-up speed gear system can be used which brings the weight down even more. By proper design, the flywheel mass could be 1/2000 of the controlled or vehicle mass.

With the foregoing in view, and such other objects, purposes or advantages as may become apparent from consideration of this disclosure and specification, the present invention consists of the inventive concept in whatsoever way the same may be embodied having regard to the particular exemplification or exemplifications of same herein, with due regard in this connection being had to the accompanying figures in which:

FIG. 1 is a front elevation of one embodiment of the device, only half being shown.

FIG. 2 is a vertical section of FIG. 1.

FIG. 3 is a view similar to FIG. 1 but of the preferred embodiment of the device.

FIG. 4 is a vertical section of FIG. 3.

FIG. 5 is a schematic wiring diagram showing one method of control.

FIGS. 6 to 10 inclusive are schematic representations of the principles involved and are for explanatory purposes only.

FIG. 11 is a fragmentary schematic view showing an alternative arrangement of the counter rotating flywheels.

FIG. 12 is the same as FIG. 11 but showing a still further embodiment.

In the drawings like characters of reference indicate corresponding parts in the different figures.

Reference should first be made to FIGS. 6 to 10 inclusive.

When a spacecraft is in orbit, it may attain a rolling motion about any one or a combination of the three major axes. It is conventional to utilize small jets to eliminate this undesirable rolling motion but it will be appreciated that the amount of fuel normally carried by a spacecraft is limited and excess use of this fuel to control the attitude of the spacecraft has resulted in aborting the mission on several occasions.

The present device overcomes the necessity of using fuel for these jets.

If a mass is orbiting or travelling in a general frictionless environment, it could be rotated from another similar object in the rate 1:1 if both objects are similar in mass and dimension.

For example, FIG. 6 shows a cylinder 10 upon axis 11. FIG. 7 shows the cylinder 10 together with a further cylinder 10' both on the common axis 11.

If an amount of energy represented by $x$ is applied from one to the other in the form of a rotational couple, the two masses 10 and 10' will share this imposed energy equally and will start the two masses rotating in opposite directions at the rate the applied energy in the combined masses of the two objects allow. FIG. 8 shows the relative position of two dots $a$ and $b$ with regard to FIG. 7 after such energy has been applied.

If there is no bearing friction existing then, of course, the two cylinders will continue to rotate in opposite directions, at the same rate.

If, after each object has rotated 90°, and a braking force is applied which dissipates the applied energy, they will come to a stop 180° apart as shown in FIG. 8.

If the cylinder 10' is reduced to half the mass of the cylinder 10 as shown in FIG. 9, and the same amount of energy is applied from 10 to 10', then the smaller cylinder 10' will rotate at twice the rate of the larger cylinder.

If we assume that a space capsule shown in FIG. 10 weighs 2,000 lbs. then the energy which would produce a rotational torque capable of rotating the capsule 2 rev. per min. against a fixed frame, would produce an angular velocity of 1 rev. per min. in space against a 2,000 lbs. counterweight arranged as shown schematically in FIG. 7.

It is, of course, impractical to use a flywheel with the same mass and size as that of the capsule therefore the size of the flywheel has to be reduced as explained relative to FIG. 9 and as an example, we could reduce so that the ratio of the inertia would be 2000:1.

Therefore if a space capsule has a properly proportioned flywheel, the operator could rotate his capsule in the plane of the flywheel by means of a simple hand crank suitably geared to the flywheel.

If the entire device is mounted on gimbals, then the operator could manipulate it in any direction as desired.

As mentioned previously, a simple flywheel is not practical since the mass rotating at a high speed, would produce serious gyroscopic effects, thus influencing the motion of the capsule outside the plane of the flywheel and the embodiments shown in FIGS. 1, 2, 3 and 4 overcome this serious defect.

Dealing first with the embodiments shown in FIGS. 1 and 2, reference character 12 illustrates a substantially cylindrical casing within which the assembly is mounted, said casing being rigidly secured to the capsule or, alternatively, mounted in gimbals as hereinbefore mentioned.

The casing is formed in two halves 12a and 12b bolted together through the perimetrical rims 13.

A fixed axle 14 extends through the casing axially as indicated, being held within end plates 15.

Journalled for rotation upon the axle 14 is a hub or bearing 15' and a further hub or bearing 16, said hubs being in axial alignment one with the other.

Radially extending support means taking the form of disc 17 extends from the hub and carries the rotor portion 18 of an electric motor assembly.

A plate 18' is held between the sections 12a and 12b of the casing and this plate carries the stator coils 19.

The rotor mounted upon hub 16 forms one part of the flywheel assembly and the rotor mounted upon hub 15 forms the other part.

It is to be understood that these rotors rotate in opposite directions one from the other and in this connection, reference character 20 shows schematically electrical brush connections to both of the rotors thus supplying the necessary power to the assemblies. However, as such electrical connections are well known, it is not believed necessary to show details at this time.

It is however, necessary and desirable to ensure that although the two parts of the rotor assemblies are rotating in opposite directions, that they maintain the same speed of rotation and in this connection I have provided equalization gearing collectively designated 21.

A bevel gear 22 is connected to each hub 15 and 16 and idler gears 23 mounted upon spindles 24 extending from plate 18', engage the bevel gears 22 thus ensuring equal speed of rotation to both parts of the flywheel assembly.

This type of construction is satisfactory providing the craft remains in the plane parallel to the plane of the flywheel.

However, if any deviation occurs then, of course, a slight gyroscopic effect may appear since the centers of gravity of the two flywheels are spaced apart from one another.

The modification illustrated in FIGS. 3 and 4 is specifically designed for use in a space craft although, of course, it could be used in a submarine or surface vessel.

In this instance, the flywheel assembly collectively designated 23' is held within a casing 24', the casing being similar to casing 12 in the previous embodiment.

The flywheel assembly 23' is divided into two parts 25 and 26 having equal mass.

A drive shaft 26' extends through the casing and is supported within end bearings 27 and a source of power 28 in the form of electric motors connected to one end of the shaft.

The central part 25 of the flywheel assembly includes the hub 29 secured to shaft 26'. Radially extending supporting means in the form of disc 30 extends from the hub and carries the main mass 31 of the flywheel and at the periphery thereof. Therefore rotation by motor 28 will rotate the flywheel part 25 in one direction.

Also secured to shaft 26' are bevel gears 32 and 32'. These engage with transfer gears 33 and 33' which in turn engage with bevel gears 34 and 34'. Bevel gear 34 is secured to hub 35 of one half of the part 26. Radially extending supporting means 36 in the form of a disc extend from the hub and the relatively heavy flywheel rim 37 is secured to the periphery of the disc 36. The mass of this portion of the assembly is half of the mass of part 25 and it runs in a plane parallel to the part 25 as clearly illustrated. The other part 26" is equal in mass to the first part 26 and these two parts together equal the mass of part 25. The construction of the part 26" is similar so that prime numbers have been given to the assembly.

The arrangement of the bevel gears 32, 33 and 34 and 32', 33' and 34', are such that the parts 26 and 26' revolve at the same speed but in opposite direction to the central part 25 and as the mass of the two parts 26 and 26" equals the mass of the part 25, gyroscopic effects are cancelled.

Reference character 38 shows a selectively engageable hand crank assembly which may be used instead of the source of power 28. It includes a hand crank 39 selectively engageable with a relatively large gear 40 which in turn drives small gear 41 mounted on a shaft upon which a relatively small gear 43 which is secured to shaft 26' thus supplying an alternative method of drive.

It will be appreciated that instead of the hand crank assembly 38, an independent source of power similar to the motor 28 may be mounted upon the opposite side, the gears 32, 33 and 34 and 32', 33' and 34' acting as equalizing gears.

When the source of power 28 is energized, and for example driving the center portion 25 in a clockwise direction, a counter torque will appear and turn the space craft counterclockwise in the plane of the flywheels.

When the space craft has completed half of its required rotation there will be exactly enough kinetic energy stored in the flywheels so that if a brake is applied to the center flywheel, the rotation will stop within the other half of the required rotation.

Reference character 44 shows a schematic form of brake applied to the rim of the central flywheel 25.

Inasmuch as the attitude controls on a space craft are relatively minor, simple stop and start buttons could be utilized by the operator, it being understood of course, that the source of power 28 is a reverisble motor and can rotate in either direction.

However when used on a submarine or ship, the control is preferably connected to the steering device of a ship and FIG. 5 shows an electrical schematic diagram of one method of accomplishing this.

However, before describing FIG. 5, reference should be made to FIG. 12 in which is shown two flywheels rotating in the same plane.

A casing 45 is provided to enclose the flywheels which are indicated by the reference characters 46 and 47. These flywheels rotate substantially in the same plane due to the fact that the peripheral rim 48 of the flywheel 46 surrounds the inturned peripheral rim 49 of the flywheel 47. The mass of the flywheel 46 is smaller in mass than the flywheel 47 in proportion to the diameters of the two flywheels so that $M_1:M_2$ equals $R_2:R_1$.

In situations where the required torque force is not greater than the prime inertia of the mass of the flywheels, the flywheels could be built as rotors of electric motors.

However, in this embodiment, an electric motor or similar device supplies power to the worm and gear assemblies 50 and 51 mounted upon a solid axle 52 which spans the casing 45. The worm and pinion assembly 50 drives a gear 53 which in turn engages a small gear 54 secured to a spindle 55 carried within bearing 56 extending from support plate 57. A larger gear 58 is formed on the end of shaft 55 and this gear in turn engages a small gear 59 secured to sleeve 60 running on the fixed axle 52, said sleeve being connected to flywheel 46 as clearly shown.

The drive from the worm gear assembly 51 is similar and the components have been given corresponding dash numbers. In this case the sleeve 60' is secured to the flywheel 47 and also runs on the fixed shaft 52.

This provides rotation to the flywheels 46 and 47 and equalizing gear assemblies 61 connect the two flywheels together for equalizing the speed of rotation in opposite directions. This equalizing gear assembly is similar to the equalizing gear assembly 21 discussed in FIG. 2.

To produce continuous torque force, the device has to be provided with two motors which are used alternately as drive motors and electric brakes and referring back to FIG. 5, the motors are identified by reference characters 62 and 63.

If motor 63 is rotated to the right with reference to the drawings, it produces a torque force to the left and a similar torque brake force is produced to the left if 62 is used as an electric brake.

Motor 63 revolves to the left and produces an opposite torque force to motor 62.

Power is supplied through the power alternating switch 64 which is a double-pole, two-way switch. In one position it shorts out the connections and in the other supplies power to the alternating switch assembly 62 which changes the driving and braking sequences between the two motors 62 and 63.

Switches 64 and 65 are operated by solenoid coils 66 and 67 respectively operating the switches through solenoid plungers and rods shown schematically by the reference character 68 and 68'.

On one of the motor axles, in this instance motor 63, I have provided a centrifugal switch assembly 69 which changes contacts immediately the motor reaches the top speed and snaps back as the motor slows down to the lowermost speed.

Reference character 70 illustrates a steering control wheel rotating an axle 71 upon which are mounted a control resistor 72, sliding control contacts 73 and 74, and a sliding power contact 75. The resistor 72 includes opposed rheostat coils 72', connected to the remainder of the circuit electric conduits as illustrated. When the steering device 70 is in the center position, no power flows through 72, 73, 74 and 75.

The control resistor 72 controls the driving and braking power alternately thus regulating the force exerted by the device.

The sliding switches 73, 74 and 75 containing sliding contacts 73', 74' and 75' respectively are connected to the solenoids 66, 66' and 67, 67' depending upon the sliding contacts being in contact due to the operation of the steering device 70.

The sliding control 75 controls the switch 64 to maintain the operation of the system in the proper sequence.

The centrifugal reverse switch 69 alternates the driving and braking sequences according to the upper and lower speed limits of the motors which are predetermined.

The operating sequence is as follows.

When the steering device 70 is in the middle position as shown in FIG. 5, power is cut off by control 75 and sliding contact switches 73 and 74 so that switches 64 and 65 are in the position in which they were placed when the last sequence was completed.

The motors 62 and 63 are stationary and the centrifugal reverse switch 69 is in the lowermost speed position allowing control power to switch sliding contact 73 and to the rheostat 75 as soon as the steering device is operated.

If the steering device 70 is moved to the right, the sliding rheostat 75 connects the right hand side of the control thus operating solenoid 66' and pulling the switch 64 into the position shown thus connecting the power intake 76 to the leads 77 which connect to the switch 65.

Sliding contact switch 73 also operated by movement of the steering device to the right supplies power to solenoid 67 thus pulling switch 65 into the position shown and transferring power from leads 77 which in turn extend through the control resistors 72 also operated by steering device 70 and thence to the motors 62 and 63. This rotates motor 63 to the left thus creating a right torque. If the control resistor 72 is only moved slightly then it is in the high resistance position so that the motor will accelerate slowly and the torque will be slight. However, if the control device 70 is continued to the right, the resistor 72 is also moved further and the resistance lowered thus speeding up the motor more rapidly thereby creating a high torque.

As the motor reaches its top speed, the centrifugal switch 69 operates thus cutting off control power from the power contact 75 and shifting the control power from sliding contact 73 to the sliding contact 74 and from solenoids 66' and 67 to solenoids 66 and 67. This changes the position of the switches 64 and 65 cutting off power from motor 63 and shorting out motor 62 which now acts as an electric brake since it is rotating in an opposite direction to motor 63 and creating a right torque.

As the system slows down to the switching speed of the centrifugal switch 69, it will switch back to the start position reversing the position of the switches 64 and 65 and starting the sequence again.

If the control wheel is moved to the left with reference to FIG. 5, then the opposite situation arises, the right turning motor 62 speeding up and motor 63 acting as an electric brake thus accentuating the creation of the left torque.

A simplified calculation shows the weight relations of the device. If a space vehicle's mass is 5000 kg. and its active radius is 3 meters, and the required angular velocity is 1 revolution per minute then $$\frac{MR}{V}=\frac{mr}{v}$$

where

M=Mass of the vehicle
$m$=mass of the flywheels
R=Radius of vehicle
$r$=radius of flywheels
V=Angular velocity of vehicle
$v$=Angular velocity of flywheels.

If the flywheel's allowable weight is 5 kg. with an active radius of 0.2 m. then the flywheel speed $x$ will be:

$$\frac{5000\times 3}{1}=\frac{5\times .02}{x}=15,000 \text{ r.p.m.}$$

This means that if a flywheel which weighs 5 kg. and has an active radius of 0.2 meter is rotated up to 15,000 r.p.m., it will possess enough energy to turn around and stop the vehicle in one minute.

The flywheel speed is, of course, only theoretical. Since the device is controlled automatically and if it is set on a 0.1 minute sequence, then the flywheel will speed up only to 1500 r.p.s. and switch to braking sequence so that the speed will fluctuate between 0–1500–0 r.p.s. in every 12 secs. By shortening the drive brake sequences, the flywheels weight and speed could be brought down to reasonable proportions.

Finally reference should be made to FIG. 11 which shows an alternative construction for the two flywheels 77 and 77'. In this instance the two discs 78 and 78' are provided with flywheel rims 79 and 79' on the inner faces thereof so that the rims are almost in interfacial contact.

However, the embodiment shown in FIG. 12 is the preferred construction.

Various modification can be made within the scope of the inventive concept disclosed. Accordingly, it is intended that what is described herein should be regarded as illustrative of such concept and not for the purpose of limiting protection to any particular embodiment thereof, but that only such limitations should be placed upon the scope of protection to which the inventor hereof is entitled, as justice dictates.

What is claimed to be the present invention is:

1. In a torque reaction attitude control device, a casing, a flywheel assembly in said casing, said flywheel assembly being journalled for rotation, said flywheel assembly being divided into two parts of equal mass, and means to induce opposite and equal rotation of said two parts, one of said parts including an inner flywheel, the other of said parts includes a pair of outer flywheels one upon each side of said inner flywheel, the mass of said inner flywheel equalling the mass of said pair of outer flywheels.

2. The device according to claim 1 which includes equalizing gear means operatively connecting said inner flywheel to said pair of outer flywheels.

3. The device according to claim 1 which includes a source of power for said inner flywheel and a separate source of power for said outer flywheels.

4. The device according to claim 2 which includes a source of power for said inner flywheel and a separate source of power for said outer flywheels.

5. The device according to claim 1 in which said source of power includes a selectively engageable hand operated gear crank system.

6. The device according to claim 3 in which said source of power includes a selectively engageable hand operated gear crank system.

References Cited

UNITED STATES PATENTS

| | | | |
|---|---|---|---|
| 2,467,870 | 8/1947 | Stephenson | 310—83 |
| 2,610,524 | 9/1952 | Maussnest | 74—61 |
| 2,908,832 | 10/1959 | Howe | 310—101 |
| 2,912,607 | 11/1959 | Duncan | 310—101 |
| 2,977,809 | 4/1961 | Becker | 74—61 |

MILTON O. HIRSHFIELD, Primary Examiner

R. SKUDY, Assistant Examiner

U.S. Cl. X.R.

310—67, 99, 101, 114